(12) United States Patent
Sykora

(10) Patent No.: US 7,736,098 B2
(45) Date of Patent: Jun. 15, 2010

(54) CONCRETE REBOUND SHIELD AND METHOD OF USE

(76) Inventor: Douglas R. Sykora, 2543 Potter Rd., Maryville, TN (US) 37804

( * ) Notice: Subject to any disclaimer, the term of this patent is extended or adjusted under 35 U.S.C. 154(b) by 399 days.

(21) Appl. No.: 11/842,634

(22) Filed: Aug. 21, 2007

(65) Prior Publication Data

US 2009/0052996 A1    Feb. 26, 2009

(51) Int. Cl.
B65G 53/00    (2006.01)
(52) U.S. Cl. .................. 406/197; 406/38; 406/157; 406/164
(58) Field of Classification Search ............. 406/197, 406/157, 164, 38
See application file for complete search history.

(56) References Cited

U.S. PATENT DOCUMENTS

| 3,758,163 | A | | 9/1973 | Kalisiak | |
| 3,794,386 | A | | 2/1974 | Hite | |
| 3,880,209 | A | * | 4/1975 | Haughn et al. | 141/95 |
| 4,009,913 | A | | 3/1977 | Beugelink | |
| 4,813,817 | A | | 3/1989 | Junier | |
| 4,900,316 | A | * | 2/1990 | Yamamoto | 604/313 |
| 5,125,190 | A | * | 6/1992 | Buser et al. | 451/456 |
| 5,376,003 | A | * | 12/1994 | Rizkalla | 433/116 |
| 6,068,025 | A | | 5/2000 | Schlecht | |
| RE37,018 | E | | 1/2001 | Cronquist | |
| 6,679,438 | B1 | * | 1/2004 | Didlo | 239/288.5 |
| 6,896,211 | B2 | * | 5/2005 | Seitz | 239/700 |

* cited by examiner

*Primary Examiner*—Joe Dillon, Jr.
(74) *Attorney, Agent, or Firm*—Pitts & Brittian, P.C.

(57) ABSTRACT

A concrete rebound shield and method of use is disclosed. The concrete rebound shield includes a bell defining an opening adapted to receive a feed hose. A collar nests within the opening of the bell and attaches to the feed hose such as to retain the bell onto the feed hose. The bell is adapted to substantially surround the feed hose and direct hydrated concrete toward a selected area.

1 Claim, 6 Drawing Sheets

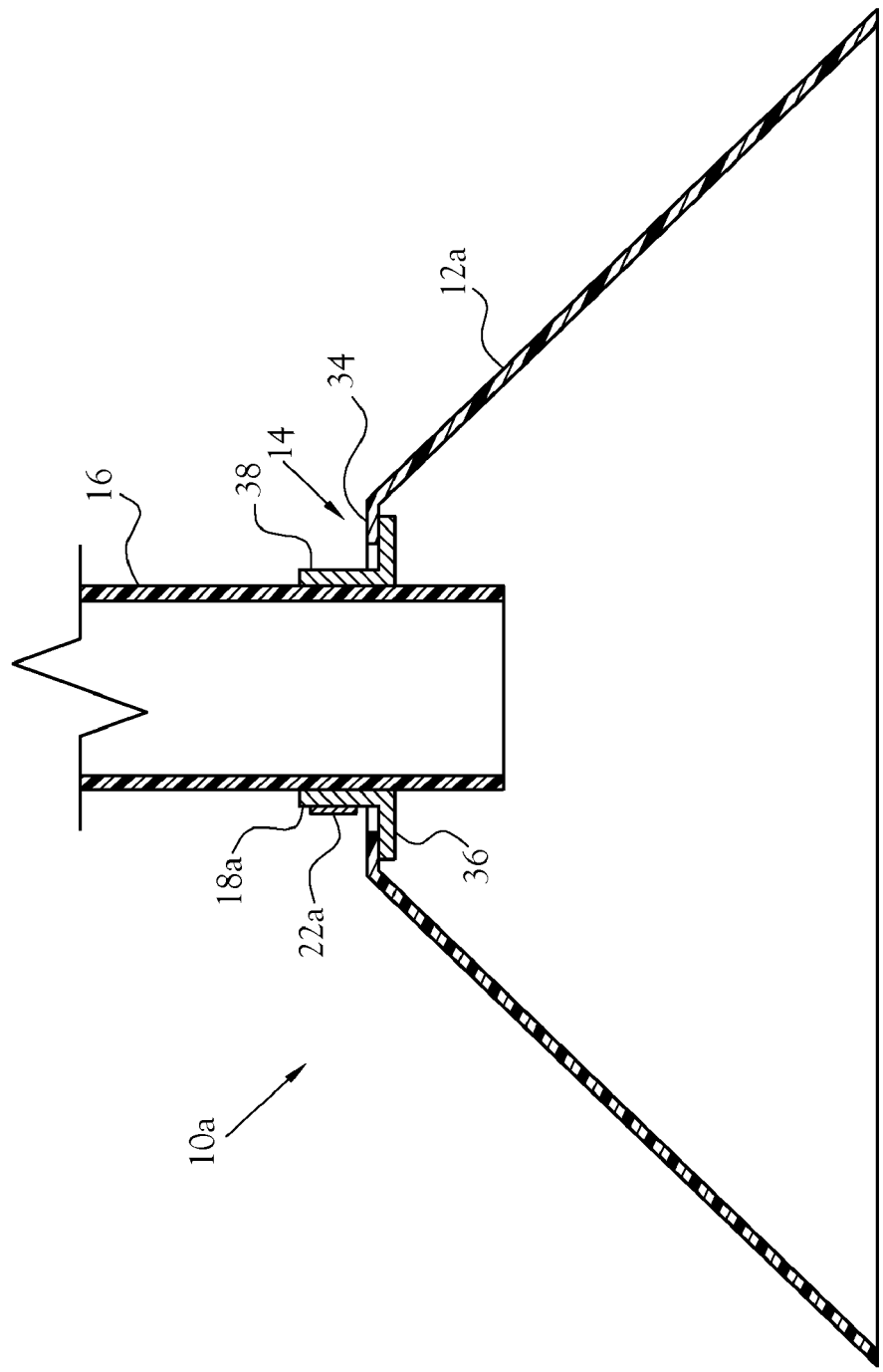

CONCRETE REBOUND SHIELD AND METHOD OF USE

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The invention relates to concrete placing machinery. More particularly, this invention relates to a shield for controlling rebound of hydrated concrete during placing of such hydrated concrete using a feed hose and pump system.

2. Description of the Related Art

Feed hoses used in conjunction with concrete pumping systems are known in the art. Such feed hoses are arranged, for example, on the concrete distributor mast of a stationary or mobile concrete pump. In fabricating a concrete structure, a form is prepared to hold a measure of hydrated concrete. A feed hose coupled to a distributor mast is then configured to hang above the form and carry hydrated concrete from a concrete pump interior into the form. Upon placement of the hydrated concrete into the form and surface finishing of the hydrated concrete, the concrete is thereafter allowed to harden and cure to form a concrete structure.

In placing concrete within a large form, such as a form for a floor or deck structure, it is often necessary to manipulate the feed hose and move the feed hose over different parts of the form in order to place hydrated concrete in different parts of the form. Such manipulation of the feed hose allows the user to distribute hydrated concrete, for example, over a large area, and to prevent excessive piling of hydrated concrete. Although many concrete pumps incorporate a mechanically repositionable distributor mast to accomplish major repositioning of the feed hose, precise manipulation of the feed hose over different parts of the form is typically accomplished through gripping the feed hose near the outlet and manipulating the feed hose by hand. Such hand manipulation of the feed hose requires a person to stand near the form and hold the feed hose outlet over the desired portion of the form.

Among the typical components of hydrated concrete are coarse aggregates such as rock or gravel, fine aggregates such as sand or grit, and hydrated cement. Due to the collective weight of these components, relatively high forces are typically required to pump hydrated concrete into a form. Moreover, the physical properties of hydrated concrete make hydrated concrete prone to splatter and rebound upon impacting a surface. Thus, while pumping hydrated concrete into a form, the hydrated concrete often impacts the form. The result is often splattering and rebound of the hydrated concrete onto the area surrounding the form.

Rebound of hydrated cement and fine aggregates can result in messing of the area surrounding the form, as well as messing of the user manipulating the feed hose. Rebounding coarse aggregates often impact the area surrounding the impact site, which can be annoying as well as dangerous. Rebounding coarse and fine aggregates, such as rocks and sand, found in hydrated concrete can foul and damage property and injure users and other bystanders. Furthermore, hydrated cement is a strong base and often irritates the skin and eyes under conditions of prolonged exposure. It is therefore desirable to provide an apparatus for limiting rebound of hydrated concrete as such hydrated concrete is placed through the outlet of a feed hose.

BRIEF SUMMARY OF THE INVENTION

A concrete rebound shield and method of use is disclosed. The concrete rebound shield includes a bell defining an opening adapted to receive a feed hose. A collar is provided to carry the bell. The collar nests within the opening of the bell and attaches to the feed hose such as to retain the bell onto the feed hose. Suitable fasteners are provided to secure the collar to the feed hose.

In use, a feed hose defining an outlet is provided to direct a flow of hydrated concrete to a region. The concrete rebound shield is attached to the feed hose by loosening the various fasteners and placing the outlet through the collar such that the feed hose is received by the opening with the outlet protruding beneath the bell. In this configuration, as concrete flows from the outlet, the bell serves to direct the hydrated concrete and deflect any rebounded hydrated concrete toward the region.

BRIEF DESCRIPTION OF THE SEVERAL VIEWS OF THE DRAWINGS

The above-mentioned features of the invention will become more clearly understood from the following detailed description of the invention read together with the drawings in which:

FIG. 6 is a cross-sectional side view of the concrete rebound shield of FIG. 5, taken along 6-6 of FIG. 5.

DETAILED DESCRIPTION OF THE INVENTION

Figure 1:
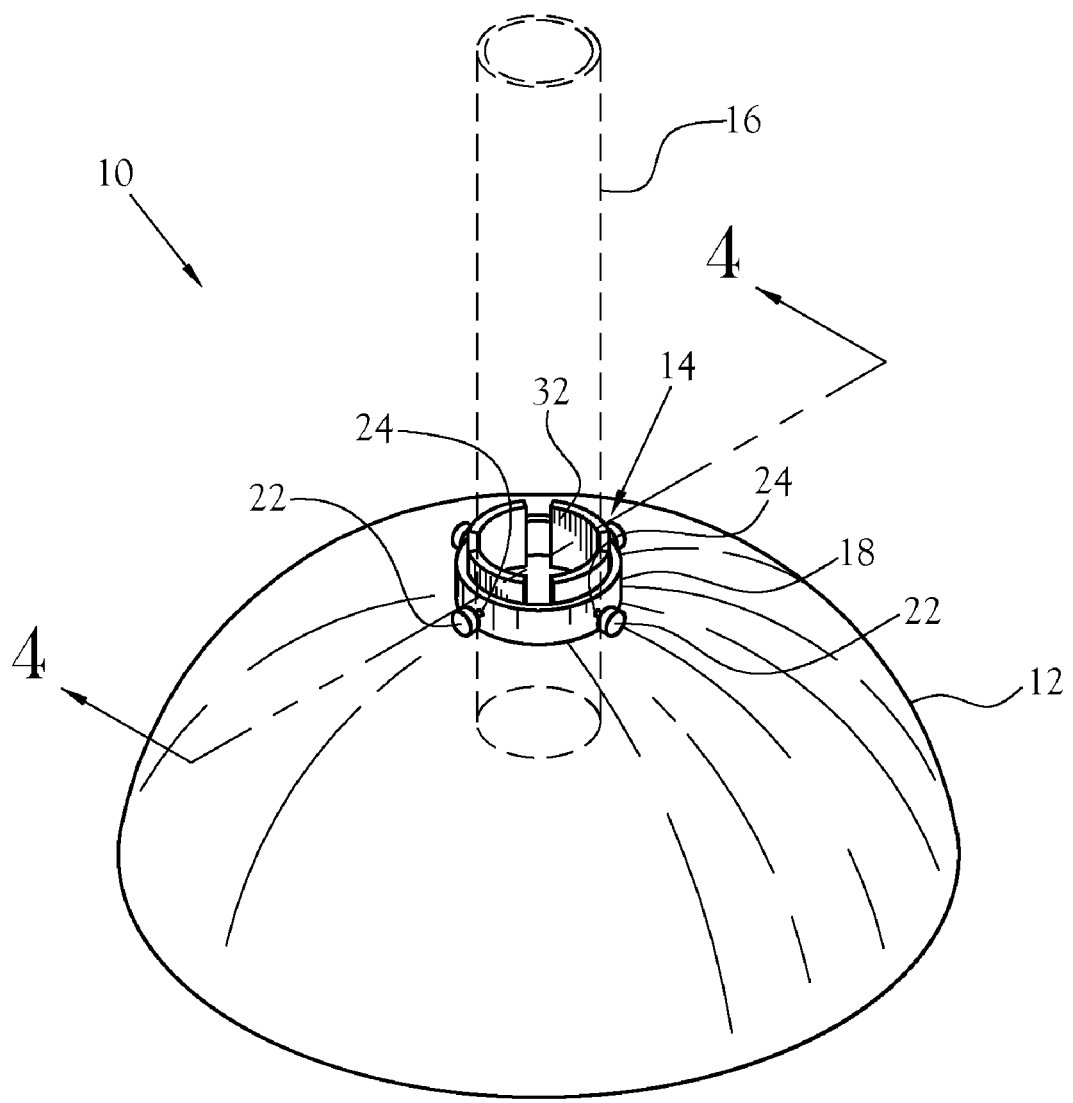
FIG. 1 is a perspective view of one embodiment of a concrete rebound shield constructed in accordance with several features of the present invention

Accordingly, a concrete rebound shield and method of use is disclosed. FIG. 1 shows a perspective view of one embodiment of a concrete rebound shield according to the present invention. The concrete rebound shield, or shield, is identified as 10 herein and in the accompanying figures. Referring to FIG. 1, the shield 10 includes a bell 12 defining an opening 14 adapted to receive a feed hose 16. The bell 12 is constructed from a substantially resilient material, including but not limited to polymer, rubber, and other such materials. In the illustrated embodiment, the bell 12 defines a substantially semi-spherical shape. However, those skilled in the art will recognize other shapes suitable for use in forming the bell 12.

It will be understood that in selecting the overall thickness and resilience of material for use in fabricating the bell 12, there is a safety versus effectiveness trade off in certain applications. For example, it is important that the bell 12 be constructed of a sufficiently high thickness and low resilience to substantially withstand the impact from an amount of rebounding hydrated concrete 20. Generally, the thicker and more rigid the bell 12, the more effective the bell 12 is in deflecting rebounded hydrated concrete 20. At the same time, in certain applications it is desirable to construct the bell 12 of a sufficiently low thickness and high deformability and resilience to allow the bell 12 to deform upon impact and return to its original configuration. Such deformability and resilience discourages damage resulting from impact with the bell 12, such as for example accidental impact of the bell 12 against a user while repositioning the feed hose 16. Therefore, it is understood that the thickness of the bell 12 and the resilience of material used in fabricating the bell 12 is a function both of the anticipated mass and energy of the rebounded hydrated concrete 20 to be deflected, as well as the desire for deformability and resilience of the bell 12 to satisfy safety concerns.

Figure 2:
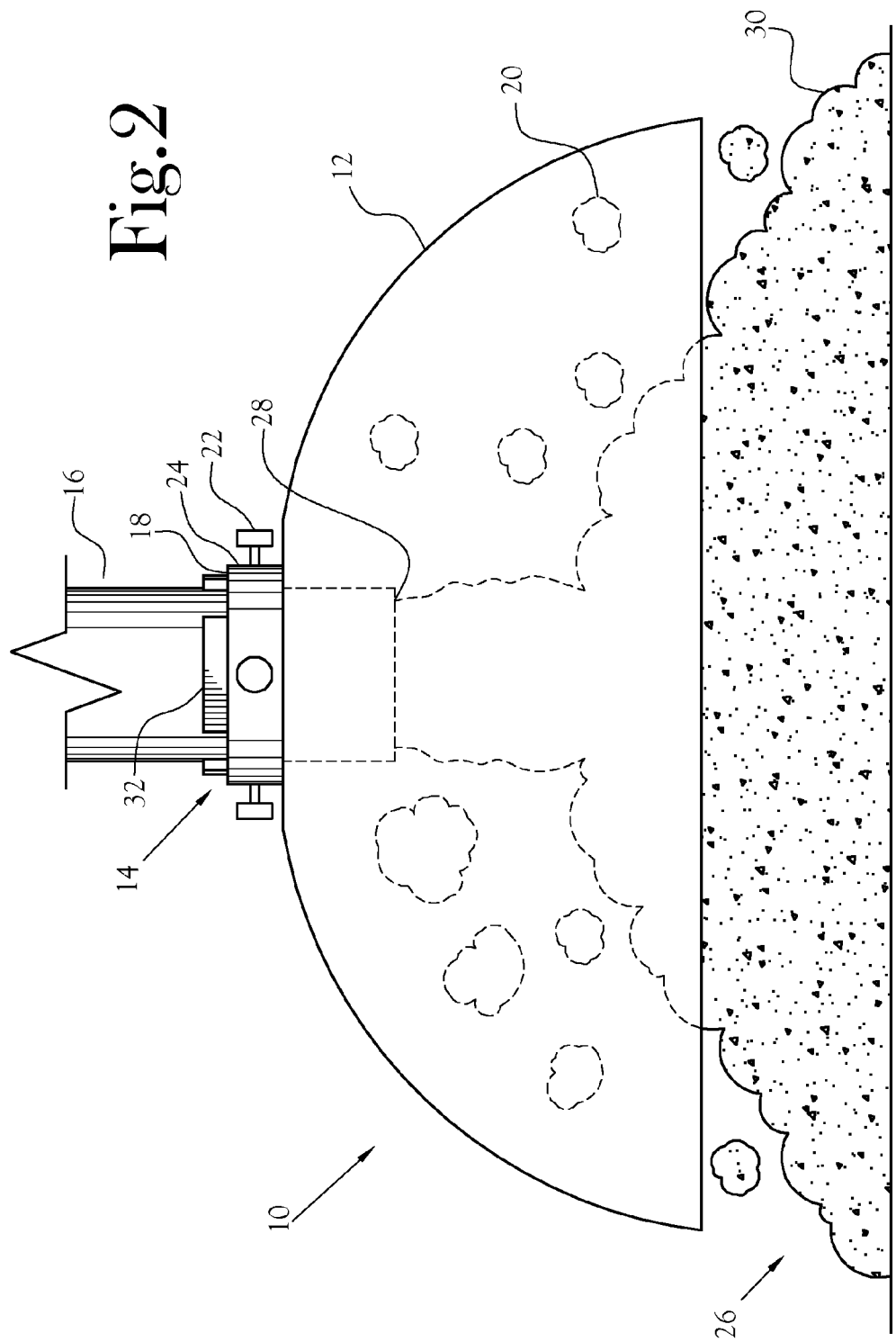
FIG. 2 is a side view of a concrete rebound shield, showing the concrete rebound shield in place around a concrete feed hose.

FIG. 2 shows a side view of the present embodiment of the shield 10. As shown in FIG. 2, a collar 18 is provided to carry the bell 12. The collar 18 nests within the opening 14 of the bell 12 and attaches to the feed hose 16 such as to retain the bell 12 onto the feed hose 16. The collar 18 is constructed of a substantially rigid material capable of supporting and maintaining the shape of the opening 14 throughout the resilient deformation of the bell 12. In the illustrated embodiment, the collar 18 and the bell 12 are shown as separate structures. However, those skilled in the art will recognize that the collar 18 and the bell 12 may be integrally formed without departing from the spirit and scope of the present invention.

Referring now to FIGS. 1 and 2, suitable fasteners are provided to secure the collar 18 to a feed hose 16. In the illustrated embodiment, the collar 18 defines a plurality of threaded through borings 24 configured radially about the collar 18. Each through boring 24 is adapted to receive a threaded fastener 22, such as a bolt, screw, or other such threaded fastener. Each threaded fastener 22 threads through a cooperating through boring 24 to establish an operative connection with the feed hose.

In the embodiment of FIGS. 1 and 2, a segmented bushing 32 is disposed between the collar 18 and the feed hose 16. The segmented bushing 32 is defined by a plurality of arcuate inserts, each having a radius of curvature substantially conforming to an external dimension of the feed hose 16. The plurality of arcuate inserts forming the segmented bushing 32 are positioned in a radial configuration between the collar 18 and the feed hose 16 so as to collectively form a segmented ring shape. Each of the arcuate inserts is repositionable along a radius of the collar 18, between the collar 18 and the feed hose 16. In this configuration, the segmented bushing 32 is expandable and collapsible within a region between the collar 18 and the feed hose 16.

The threaded fasteners 22 each thread through a cooperating through boring 24 and engage the segmented bushing 32 to bias the arcuate inserts toward the feed hose 16. The segmented bushing 32 thereby collapses toward the feed hose 16 to engage and establishes a frictional connection with the feed hose 16. In this configuration, as the various threaded fasteners 22 cooperate with the segmented bushing 32 to secure the collar 18 to the feed hose 16, the segmented bushing 32 serves to establish a snug connection between the collar 18 and the feed hose 16. Likewise, loosening of the threaded fasteners 22 results in disengagement of the segmented bushing 32 with the feed hose 16, thereby allowing the feed hose 16 to be selectively removed from the shield 10. In one embodiment, the threaded fasteners 22 are rotatably secured to the segmented bushing 32. However, those skilled in the art will recognize that permanent attachment of the threaded fasteners 22 to the segmented bushing 32 is not necessary to accomplish the present invention. For example, in another embodiment the threaded fasteners 22 engage the segmented bushing 32 by a frictional connection.

Figure 3:
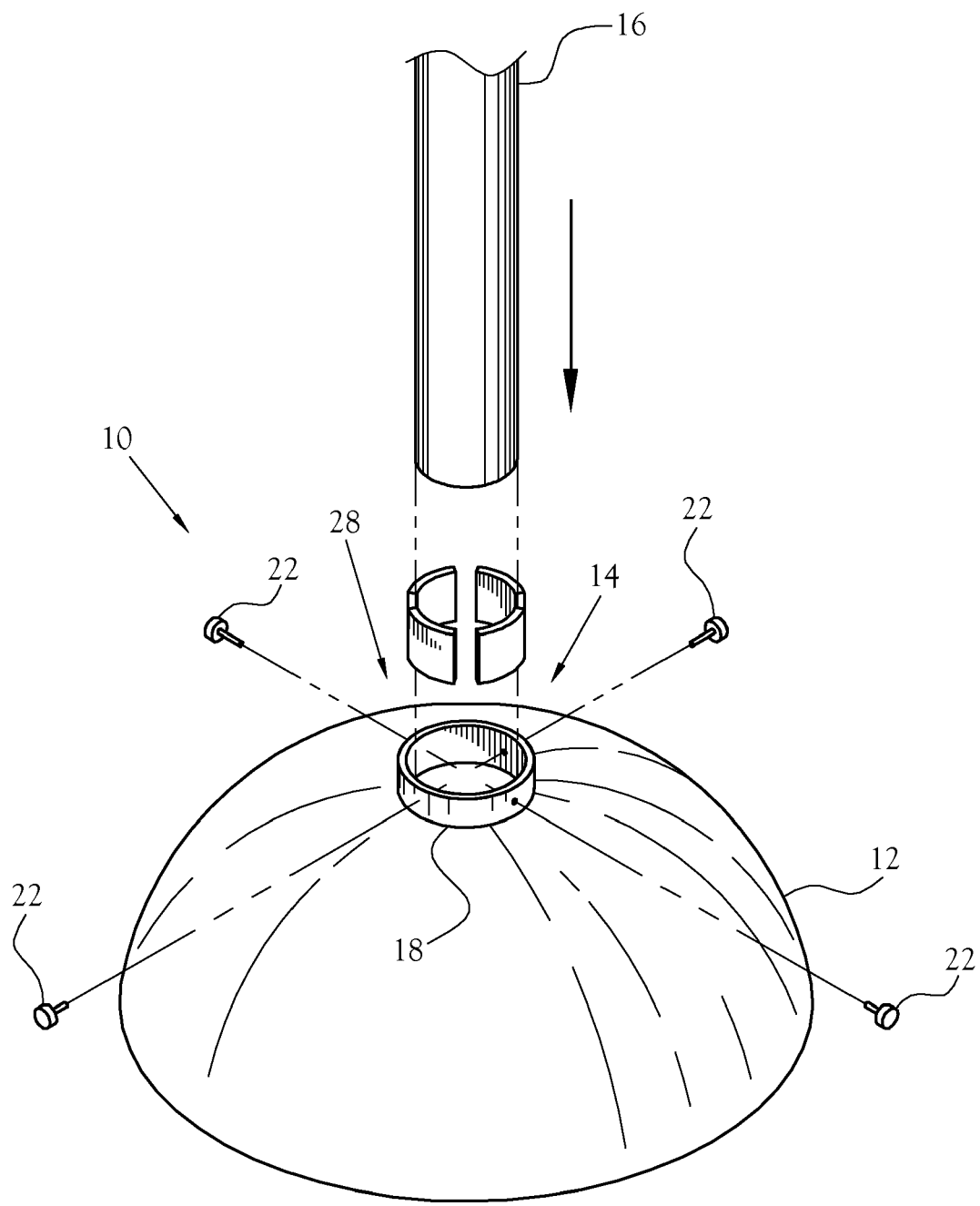
FIG. 3 is an exploded perspective view of the concrete rebound shield of FIG. 1.
Figure 4:
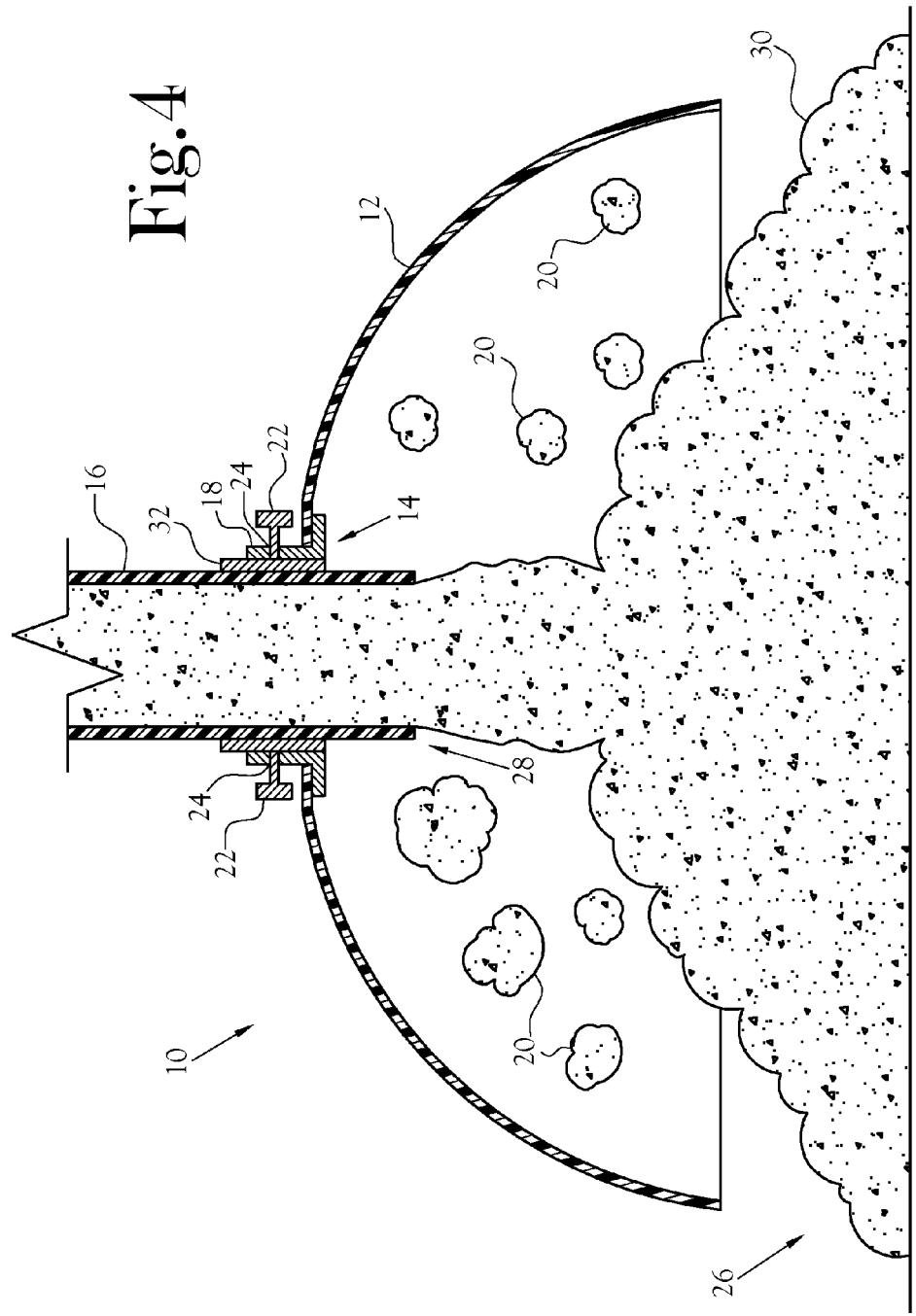
FIG. 4 is a cross-sectional view of the concrete rebound shield of FIG. 1, taken along 4-4 of FIG. 1.

Referring to FIG. 3, in use, a feed hose 16 defining an outlet 28 is provided to direct a flow of hydrated concrete 30 to a region 26. The shield 10 is attached to the feed hose 16 by loosening the threaded fasteners 22 and placing the outlet 28 through the segmented bushing 32 and the collar 18 such that the feed hose 16 is received by the opening 14 with the outlet 28 protruding beneath the bell 12. As shown in FIG. 4, the fasteners 22 are then tightened such that the segmented bushing 32 establishes frictional engagement with the feed hose 16, thereby securing the shield 10 to the feed hose 16.

Following attachment of the shield 10 to the feed hose 16, the outlet 28 is brought into substantial proximity with the region 26 such that hydrated concrete 30 is allowed to flow into the region 26. Upon flow of the hydrated concrete 30 into the region 26, it is anticipated that a portion of the hydrated concrete 30 impacts a surface proximate the region 26 and rebounds, thereby forming projectiles of rebounded hydrated concrete 20 projected substantially away from the region 26. In this configuration, the bell 12 serves to direct hydrated concrete and deflect the rebounded hydrated concrete 20 toward the region 26, thereby substantially containing and replacing the rebounded hydrated concrete 20 substantially within the region 26.

Figure 5:
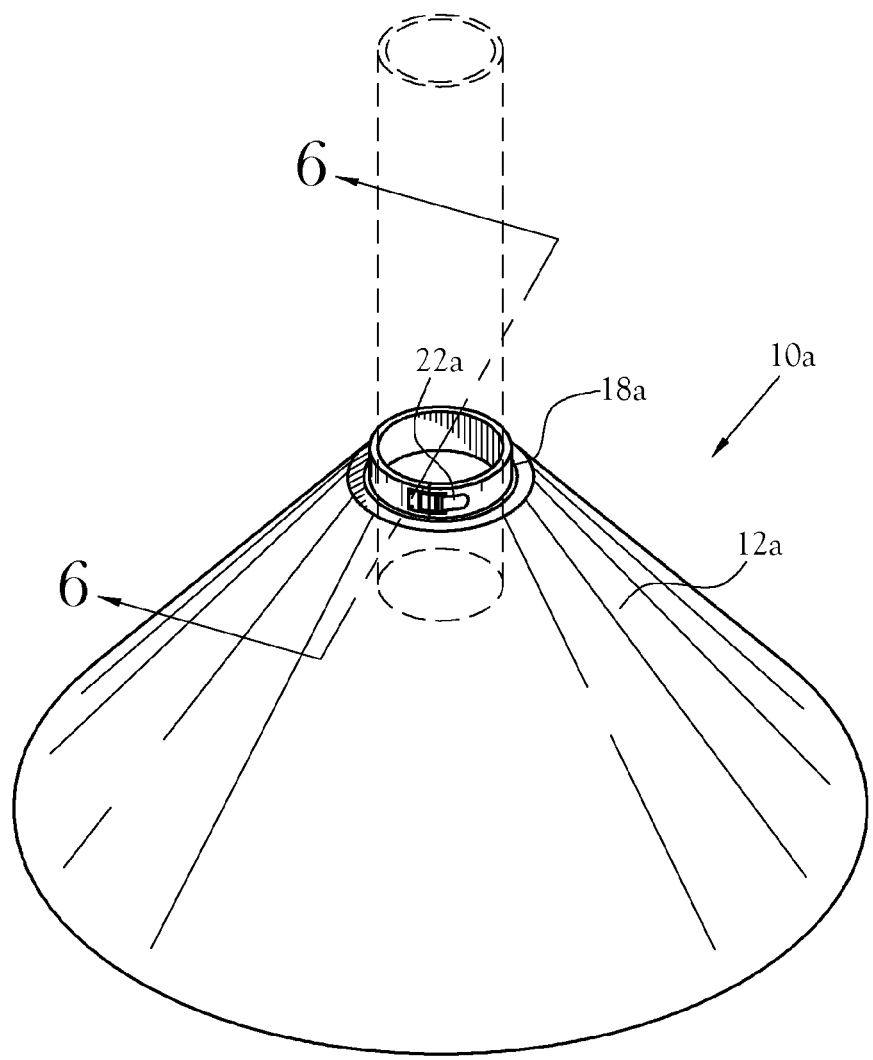
FIG. 5 is a perspective view of another embodiment of a concrete rebound shield.

FIGS. 5 and 6 illustrate another embodiment of the concrete rebound shield 10a. In this embodiment, the bell 12a defines a truncated conical shape. The opening 14 is defined by the truncated portion of the bell 12a, and the feed hose 16 is received through a collar 18a disposed within the opening 14. The bell 12a defines a lip 34 substantially surrounding the opening 14 and defining the truncated portion of the bell 12a. The collar 18a defines a substantially rigid band 38 nested radially within the opening 14. The collar 18a further defines a shelf 36 which extends beneath the lip 34 to carry and support the bell 12a.

As shown in FIG. 6, the opening 14 is sized to a radial dimension substantially greater than the dimension of the feed hose 16. The collar 18a is adapted to constrict from a first radial dimension to a second radial dimension. In the second radial dimension, the collar 18a is adapted to establish a frictional connection between the collar 18a and a feed hose 16. A clamp 22a is configured to selectively constrict the collar 18a to the second radial dimension. The clamp 22a is adapted to be selectively disengaged, thereby increasing the radial dimension of the collar 18a to the first radial dimension. Upon selective engagement of the clamp 22a, the collar 18a tightens, thereby allowing the collar 18a to secure to the feed hose 16. In this configuration, the clamp 22a serves to secure the collar 18a to a feed hose 16.

From the foregoing description, it will be recognized by one skilled in the art that a concrete rebound shield has been disclosed. The concrete rebound shield provides an apparatus to direct concrete from an outlet of a concrete feed hose toward a selected area, such as a form. As well, the concrete rebound shield provides an apparatus to limit the rebound of hydrated concrete as such hydrated concrete is placed through the outlet of a feed hose.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

Having thus described the aforementioned invention, what is claimed is:

1. A method for distributing concrete using a feed hose adapted to convey hydrated concrete to a selected area through an outlet defined by the feed hose, said method comprising the steps of:
   (a) providing a bell defining an opening adapted to receive the feed hose;
   (b) providing a fastening device adapted secure the feed hose within the opening, the fastening device including a collar nested within the opening, the collar defining a plurality of through holes, the fastening device further including a plurality of threaded fasteners, each of the threaded fasteners being adapted to be received by one of the plurality of through holes, the fastening device further comprising a segmented bushing, each of the threaded fasteners being adapted to engage the segmented bushing to bias the segmented bushing toward the feed hose;
   (c) placing the feed hose through the collar, the segmented bushing, and the opening such that the bell substantially surrounds the outlet; and
   (d) securing the feed hose within the opening by threading the threaded fasteners through the through holes to bias the segmented bushing toward the feed hose such as to establish a frictional connection between the feed hose and the segmented bushing;
   (e) allowing the feed hose to convey hydrated concrete to the selected area; and
   (f) allowing the bell to direct hydrated concrete toward the selected area.

* * * * *